US008743879B2

(12) United States Patent
Haddad et al.

(10) Patent No.: US 8,743,879 B2
(45) Date of Patent: Jun. 3, 2014

(54) LABEL SWITCHED ROUTING TO CONNECT LOW POWER NETWORK DOMAINS

(75) Inventors: Wassim Haddad, San Jose, CA (US); Joel Halpern, Leesburg, VA (US); Samita Chakrabarti, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 235 days.

(21) Appl. No.: 13/228,321

(22) Filed: Sep. 8, 2011

(65) Prior Publication Data

US 2012/0287932 A1    Nov. 15, 2012

Related U.S. Application Data

(60) Provisional application No. 61/486,100, filed on May 13, 2011.

(51) Int. Cl.
*H04L 12/28*    (2006.01)
(52) U.S. Cl.
USPC ............................ 370/392; 370/431; 370/474

(58) Field of Classification Search
USPC .......................................... 370/431, 474, 392
See application file for complete search history.

(56) References Cited

U.S. PATENT DOCUMENTS

| 7,269,132 B1* | 9/2007 | Casey et al. .................... 370/219 |
| 7,558,270 B1* | 7/2009 | Wilford et al. ............. 370/395.42 |
| 2009/0041019 A1* | 2/2009 | He et al. ......................... 370/392 |
| 2009/0141741 A1* | 6/2009 | Kim et al. ...................... 370/474 |

* cited by examiner

*Primary Examiner* — Yemane Mesfin
*Assistant Examiner* — Henry Baron
(74) *Attorney, Agent, or Firm* — Blakely Sokoloff Taylor Zafman LLP

(57) ABSTRACT

A network element is described. In one embodiment includes receiving a packet from the host in the first domain at the network element in the first domain, the packet including a destination address to the host in the second domain, the destination address being formed by replacing an Interface Identifier of an IP address by a second domain label and a shortened Media Access Control (MAC) address, the second domain label identifying the second domain. A routing label and the shortened MAC address are attached to the received packet, and the packet is sent on a label switched path indicated by the label to the second domain.

27 Claims, 6 Drawing Sheets

LABEL SWITCHED ROUTING TO CONNECT LOW POWER NETWORK DOMAINS

CROSS-REFERENCE TO RELATED APPLICATIONS

This application claims the benefit of U.S. Provisional Application No. 61/486,100, filed May 13, 2011, entitled Applying MPLS to the Internet of Things—Tackling the 6LoWPAN Case, which is hereby incorporated by reference.

FIELD

Embodiments of the invention relate to the field of routing packets between different domains; and more specifically, to routing packets to conserve power between low power network domains.

BACKGROUND

The "Internet of Things" (IoT) is a rapidly emerging paradigm that, among other things, introduces new types of Internet endpoints. In the IoT world, even a tiny device with limited processing capabilities, little battery power, a small memory and limited networking and service capabilities can become an endpoint. These tiny devices may spend most of their lifetimes in hibernation mode. Such low power IoT devices may be assigned a wide range of tasks such as sensing different elements or factors in their immediate surroundings. If costs are kept low they can be deployed in large numbers and cover vast geographic areas. Such devices are also proposed for use in automation and entertainment application in office and factory environments, among others.

Moreover, using Internet protocols, these tiny devices can be expected to discover and self-configure key networking parameters that would grant them membership in a specific area and enable them to answer queries sent by local and remote devices at any time. In some scenarios, the number of responses can significantly increase which in turn, may increase the burden on the routing infrastructure. This routing infrastructure may also be made of power constrained devices.

In order to reduce power and processing demands on this new class of tiny devices, a 6LoWPAN (Internet Protocol v6 over Low Power Wireless Persona Area Networks, IEEE 802.15.4) working group of the IETF (Internet Engineering Task Force) is introducing optimizations to IPv6 neighbor discovery protocols. The optimizations include addressing mechanisms and duplicate address detection stateless compression protocols and other advancements. The resulting developments can be used not only for very low power devices but also for any device for which the reduction of air time, power consumption, or processing resources is valued.

SUMMARY

In one embodiment of the invention, a method is performed by a network element for routing a packet from a host in a first domain in which it is located to a host in a second connected domain, each domain having a plurality of hosts that connect through a common network element of the respective domain, the network element being in the first domain and connected through a label switched path to the second domain. The method includes the steps of receiving a packet from the host in the first domain at the network element in the first domain, the packet including a destination address to the host in the second domain, the destination address being formed by replacing an Interface Identifier of an IP address by a second domain label and a shortened Media Access Control (MAC) address, the second domain label identifying the second domain, parsing the received packet to determine a destination of the packet in the second domain, based on the destination address attaching a routing label and the shortened MAC address to the received packet, the routing label indicating a path to the second domain and the shortened MAC address indicating the destination host in the second domain; and sending the packet with the attached routing label and shortened MAC address on a label switched path indicated by the label to the second domain.

In another embodiment of the invention, a network element for use in a first domain connected through a label switched path to a second domain, each domain having a plurality of hosts that connect through a common network element of the respective domain, wherein the network element is operative to route packets from a host in the first domain to a host in the second domain is described. The network element includes an ingress module operative to receive a packet from the host in the first domain at the network element, the received packet including a destination address of the host in the second domain, the destination address being formed replacing an Interface Identifier of an IP address by a second domain label and a shortened MAC (Media Access Control) address, the second domain label identifying the second domain, a processor operative to parse the received packet to determine a destination of the packet in the second domain, based on the destination address and to attach a routing label and the shortened MAC address to the received packet, the routing label indicating a path to the second domain and the shortened MAC address indicating the destination host in the second domain, and an egress module operative to send the packet with the destination address and the routing label on a label switched path indicated by the label to the second domain.

In another embodiment of the invention, a method is performed in a network element for routing a packet from a host in a first domain to a host in a second connected domain, each domain having a plurality of hosts that connect through a common network element of the respective domain, the network element being in the second domain and connected through a label switched path to the first domain. The method includes the steps of receiving a packet though a label switched path from the host in the first domain at the network element in the second domain through a network element in the first domain, the packet including an attached destination label to indicate the second domain and an attached shortened MAC address to indicate a destination host in the second domain, determining the destination host using the shortened MAC address, removing the attached destination label and the attached shortened MAC address, and sending the packet to the determined destination host.

In another embodiment of the invention, a network element for use in a second domain connected through a label switched path to a first domain, each domain having a plurality of hosts that connect through a common network element of the respective domain, wherein the network element is operative to route packets from a network element in the first domain to a host in the second domain is described. The network element includes an ingress module operative to receive a packet through a label switched path from the host in the first domain at the network element through a network element in the first domain, the packet including an attached second domain label to identify the second domain and an attached shortened MAC address to indicate a destination host in the second domain, a processor operative to determine the destination host using the shortened MAC address and to remove the attached second domain label and the attached shortened MAC address, and an egress module operative to send the packet to the determined destination host.

In another embodiment of the invention, a method is performed in a network element in a first domain for routing a packet to a host in a second connected domain, each domain having a plurality of hosts that connect through a common router of the respective domain, the network element being in the first domain and connected to the second domain using a label switched path through routers of the respective domains. The method includes the steps of generating a packet for the host in the second domain at the network element in the first domain, the packet including a destination address to the host in the second domain, the destination address being formed by replacing an Interface Identifier of an IP address by a second domain label and a shortened Media Access Control (MAC) address, the second domain label identifying the second domain, and sending the packet to the router in the first domain.

In another embodiment of the invention, a method is performed by a network element in a first domain for routing a packet to a host in a second connected domain, each domain having a plurality of hosts that connect through a common router of the respective domain, the network element being in the first domain and connected to the second domain using a label switched path through routers of the respective domains. The method includes the steps of generating a packet for the host in the second domain at the network element in the first domain, the packet including a destination address to the host in the second domain, the destination address being formed by replacing an Interface Identifier of an IP address by a second domain label and a shortened Media Access Control (MAC) address, the second domain label identifying the second domain, and sending the packet to the router in the first domain.

In another embodiment of the invention, a network element in a first domain operative to route a packet to a host in a second connected domain, each domain having a plurality of hosts that connect through a common router of the respective domain, the network element being in the first domain and connected to the second domain through routers of the respective domains is described. The network element includes a processor operative to generate a packet for the host in the second domain at the network element in the first domain, the packet including a destination address to the host in the second domain, the destination address being formed by replacing an Interface Identifier of an IP address by a second domain label and a shortened Media Access Control (MAC) address, the second domain label identifying the second domain, and an egress module operative to send the packet to the router in the first domain.

As a result, the various embodiments of the invention enable low power communication between hosts in different network domains using simpler addressing and optionally larger payloads.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
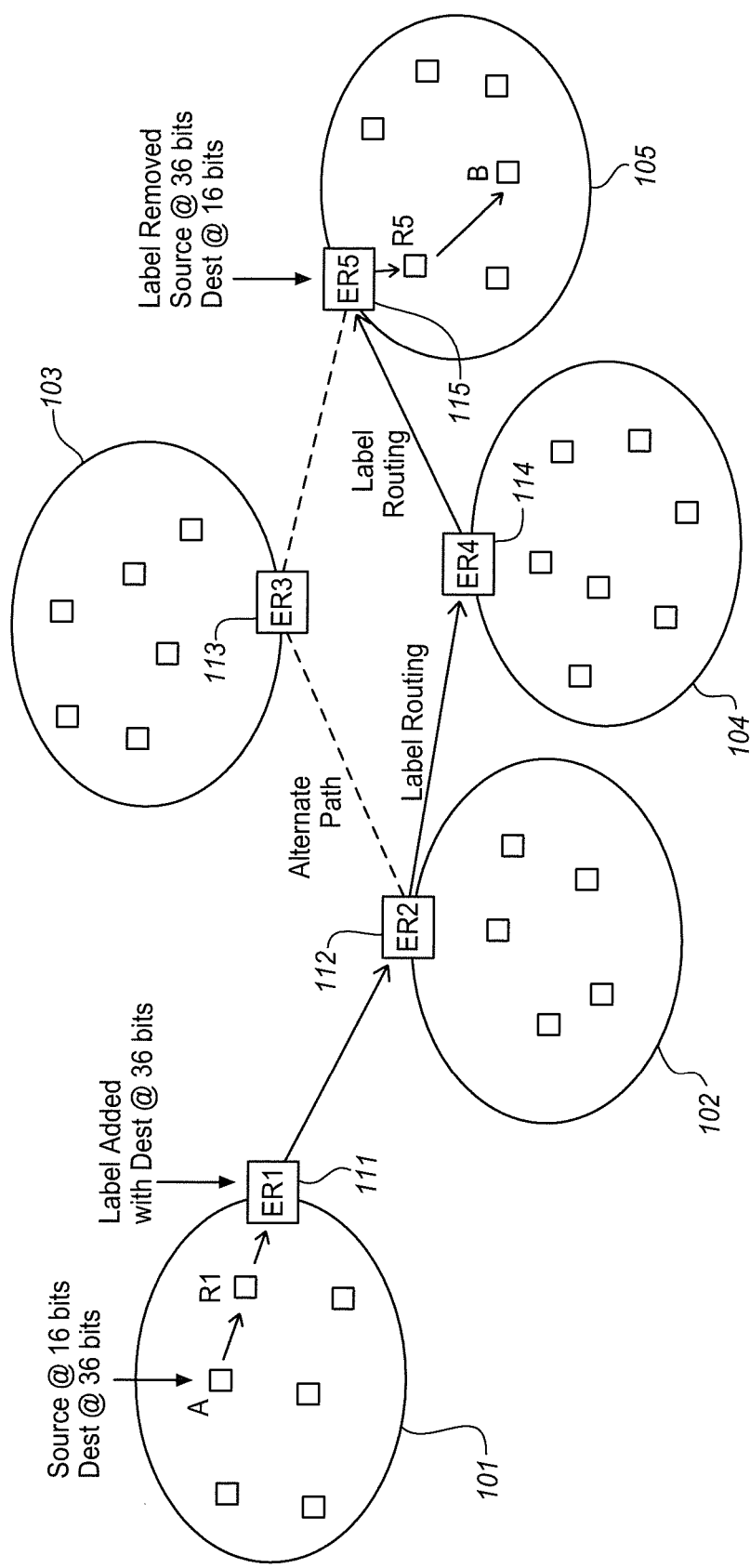
FIG. 1 is a diagram of different network domains connected by edge routers through label switched paths to allow communication from hosts in one domain with host in another domain according to an embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Multiprotocol Label Switching (MPLS) is a routing infrastructure that can be made using constrained routers in order to minimize data packet size and enable on-demand traffic engineering. In one embodiment of the invention, a small number of querying nodes spread within a particular geographic area send queries to one or multiple sensors using a specific combination of short Media Access Control Layer (MAC) addresses and MPLS labels. The choice of labels can depend on the Quality of Service (QoS) that is needed at that particular time.

While the average bandwidth for sensor networks is very low, events that cause many sensors to report can cause surges in the bandwidth. For example, if there is a sudden problem on a bridge, or a sudden weather alarm in a particular zone, a large number of sensors may have to report immediately, and those reports may need to be received with high confidence. These events are major drivers for rapid bandwidth acquisition and changing prioritization. The combination of short MAC addresses and labels described herein can address QoS requirements without additional signaling messages and remove a need to carry IPv6 headers in data packets.

6LowPAN enables end to end data flows using a variation of Internet protocols from Internet Protocol version 6 (IPv6). While it can be maintained from a central server and scaled for very large networks, it reduces the use of code and memory. The protocol stack includes an application layer, a UDP (User Datagram Protocol) and ICMP (Internet Control Message Protocol) layer, a modified IPv6 layer, a MAC (Media Access Control) layer, and a PHY (Physical) layer.

FIG. 1 is a diagram of communication between multiple networks connected together through edge routers. The standard architecture for a 6LoWPAN is a stub network. This is shown, for example in FIG. 1, as stub networks 101, 102, 103, 104, 105. Each stub network has an edge router ER1, ER2, ER3, ER4, ER5 to allow access to nodes outside its respective network. Within each stub network, there may be hosts and routers. The hosts can communicate with each other through a router and the routers can communicate with other routers and with the hosts.

The particular architecture of FIG. 1 is shown to simplify the disclosure. Embodiments of the invention may be applied to other network configuration which use more than one edge router and which provide other forms of ingress and egress from within a particular network.

The stub networks as shown in FIG. 1 communicate only with other stub networks, however, the edge routers may also provide connection to other networks and devices. Within LoWPAN a simple network provides connections through a backhaul link to other routers and supports connections to the Internet and to other routers and servers. In an Extended LoWPAN a backbone link connects edge routers to each other and to other routers and server. These configurations may be used to connect the networks of FIG. 1 to other devices. The networks may also be connected to other devices using connections and configurations outside of LoWPAN.

Referring back to FIG. 1, the left-most network 101 has routers, such as R1, and hosts, such as host A. Each host has a full IPv6 address and a domain address for the stub network. The host can be any type of device that can benefit from reduced power consumption. In one example, the host is a smoke detector in an old growth forest waiting in idle mode for a fire. However the same techniques described herein can also be applied to desktop computers, peripherals, portable music players and any other Wi-Fi-enabled device. The host can also provide LoWPAN or 6LoWPAN as a special low power mode and then operate in other radio modes as needed, depending upon the particular circumstance and the communication to be made. The host can also serve as a router within the domain and the router can also serve as a host.

According to 6LoWPAN, each host uses a modified version of IPv6 neighbor discovery protocol in order to enable the host to configure and register its IPv6 and Media Access Control (MAC) addresses. Due to the large size of IPv6 headers, 6LoWPAN uses strong stateless compression algorithms in order to carry more information in the small amount of space reserved to carry useful data. The compression algorithms also minimize the power consumption of the radio at a small cost in using more power in the processor.

Table 1 shows a general configuration of a packet specified for use in 6LoWAPAN with a full header. The packet corresponds to one full 802.15.4 frame of 127 Bytes.

TABLE 1

| 21B | 1B | 40B | 8B | 53B | 4B |
|---|---|---|---|---|---|
| MAC | L | IPv6 | UDP | Payload | FCS |

In Table 1, the full MAC address is used followed by a LoWPAN abstraction header (L), defined in 802.15.5, followed by a full IPv6 address, and a User Datagram Protocol (UDP) header. With a Frame Check Sequence (FCS), there are 53 Bytes left for payload. While the packet structure of Table 1 fully supports IPv6, less than half of the packet is available for payload. The packet is constrained in size in order to reduce the power consumed by radio transmitters in the system. In order to allow more payload to be transmitted in fewer frames, 6LoWPAN provides for a shortened header as shown below in Table 2.

TABLE 2

| 9B | 2B | 4B | 108B | 4B |
|---|---|---|---|---|
| MAC | L | UDP | Payload | FCS |

In Table 2, a shortened MAC address of 9 Bytes or 72 bits, as compared to the normal 21 Bytes, is used together with a longer 2 Byte abstraction header and a shortened 4 B UDP. This allows for more than twice the payload. As a result data can be sent with half the frames and the transmitting host can shut down or sleep more quickly lowering power consumption generally and lowering the power consumed by the radio transmitter.

The shortened 9 Byte MAC address is not unique everywhere but is intended to be unique within the LoWPAN network to which the edge router is connected. As a result, while the shortened address packet can be used within the LoWPAN network, for communication outside a host's home network the long MAC address must be used. The host will know whether destination nodes are within its LoWPAN network and use the appropriate address format to reach a node, depending upon whether it is inside or outside this network. The edge router will simply see the address and route the packet accordingly. As a result, the improvements offered by the shortened addresses may not be available for many of the host's messages.

If hosts located in different 6LoWPANs want to communicate, the operation of the LoWPAN network can be modified to allow the benefits of low power usage. For example, a querying host A located in a particular 6LoWPAN area 101 might request specific data from one or multiple sensors or actuators B located in the a different 6LoWPAN area 105. The host in such a case configures a packet that includes its source address, B's destination address and a payload. The packet is sent to the edge router ER1 to be forwarded to the edge router ER5 in B's LoWPAN network.

In order to reach the edge router, the host only requires an identifier that is unique within its domain. The edge router knows the domain and can identify the host to any external device. In one embodiment of the invention, the edge router sends a packet to the edge router with only a link local IPv6 address and uses only a 16-bit short MAC address to identify itself to its edge router.

Table 3 shows a standard IPv6 address in which the Routing Prefix identifies the network, the Subnet ID identifies a subnetwork within the network of the routing prefix and the Interface ID identifies the node within the network. The Interface ID is typically the 64-bit MAC address. Together these fields not only uniquely identify the node whether a source node or a destination node, but also identify the network in which the node resides.

TABLE 3

| 48 bits | 16 bits | 64 bits |
|---|---|---|
| Routing Prefix | Subnet ID | Interface ID |

Table 4 shows a link local IPv6 address in which the Interface ID is the same but the network identification is replaced with only the Link Local prefix which has the hexadecimal value fe80::. Since the packet stays within the network and subnetwork, the Routing prefix and Subnet ID are not used.

TABLE 4

| 10 bits | 54 bits | 64 bits |
|---|---|---|
| Link Local Prefix | zeroes | Interface ID |

Rather than using this extensive address, a shorter address is created in which the Interface ID is replaced with an address that contains far less data. The 16-bit MAC address is an address that is unique to host within the domain. This address may be a truncated version of the nodes 64-bit MAC address or it may be a unique value assigned by a router, selected by the node or configured in neighbor discovery. The Multiple Protocol Label Switching (MPLS) label is a short label to identify the domain. As described it can follow MPLS standards, if desired, however, any other type of label may be used as an alternative. The shorter address is shown in Table 5.

TABLE 5

| 10 bits | 54 bits | 28 bits | 20 bits | 16 bits |
|---|---|---|---|---|
| Link Local Prefix | zeroes | zeroes | MPLS | MAC |

For actual physical layer transmissions over the air interface, the shortened address can be compressed. For communications with other domains that have agreed upon a 20-bit label, the address can be compressed to the form shown in Table 6.

TABLE 6

| 20 bits | 16 bits |
|---|---|
| MPLS | MAC |

For communications within the domain, the addresses, both source and destination addresses, can be compressed still further to the form shown in Table 7. Similarly, if a node within a domain forms a packet to send to a node in another domain, the destination address will identify the destination domain as indicated by Table 6. However, for the benefit of the edge router within the domain, the source address can be limited to the Table 7 form. These shortened address forms can greatly reduce power consumption for the hosts as well as for the routers.

TABLE 7

| 16 bits |
|---|
| MAC |

To implement shortened Interface IDs as suggested above, the edge routers run MPLS to forward packets between different domains. While MPLS is used in the described embodiments, other labeling systems or short address formats may be used. MPLS provides a short domain address as well as a set of standards for communicating between the domains. For this purpose, each edge router has a unique 20-bit MPLS label. This label is shorter than a standard MPLS label.

To establish the addressing, each edge router advertises its 20-bit MPLS label to all of the nodes and routers within its own domain. This is instead of advertising an IPv6 prefix. The MPLS labels can be pre-assigned by a central entity that can also be in a remote location or a remote network. The central entity can also compute label switched paths (LSPs) and build forwarding tables for the LSPs. The forwarding tables can then be pushed out to each edge router. This configuration can be performed using a different wireless networking system, such as Wi-Fi, satellite or a cellular wireless packet data system. For example, a remote entity with full knowledge of the 6LoWPAN domain topology can compute all the paths, populate routing tables and push the routing tables to the ERs over a wireless cellular network without using the resources of the links between edge routers on the MPLS signaling system.

Each node listens to the advertisements of the edge router and learns the 20-bit MPLS label for the domain. In order to allow communications with other domains, the nodes can be pre-provisioned with the labels associated with the edge routers of the domains that are connected to the home domain or with which they are otherwise allowed to communicate. Alternatively, the nodes can obtain the provisioning from the edge router.

In addition to the labels for other domains, hosts are provided with the short MAC addresses of hosts in other domains. These MAC addresses may be pre-provisioned or provided by the edge router. Each short MAC address outside the domain is associated with a label for the other domain.

In one embodiment, there are a few querying nodes that are spread within each domain. These nodes are the only ones that are aware of the labels for other domains. These nodes can gather information from other nodes in the domain and forward that information to other domains. Similarly, the list of hosts in other domains may also be limited. As a result, a host may only be allowed to query and respond to one or a few hosts in another domain. This preserves memory resources and may also be used to improve security.

The edge router maintains an entry for all of the hosts in other domains that are allowed to communicate with hosts within its domain. It also maintains a list of all of the short MAC addresses for hosts within its domain. Each host has an entry in the associate edge router's cache memory, which binds its long and short MAC addresses and its domain label as well as the corresponding application.

In one embodiment, nodes communicate within the domain using only the 16-bit short MAC address. Between domains, labels and MPLS routing is used. Querying nodes and responding hosts can address each other using a domain label and a short MAC address for a destination address. Each host can configure its own IPv6 link local address based on the label received in a router advertisement (RA) message. Instead of advertising a 64-bit IPv6 prefix, each RA can advertise its own label which is then can be used together with the 16-bit short address to configure the interface identifier for a source address.

Referring back to FIG. 1, a querying node (A) in one domain 101 sends a message to a host node (B) in a different domain 105. In the illustrated embodiment, the querying node is not enabled to communicate directly with the edge router so it sends the message to the local router R1 in the first domain 101. This request is recognized by the router as being addressed to a destination outside the domain, so the router forwards the message to the edge router ER1 for the domain.

As shown in FIG. 1, the message from the querying node A carries a source address of 16 bits. This is the short address as shown in Table 7. The destination address is 36 bits as shown in Table 6 and consists of the 20-bit label for the destination domain together with the 16-bit short address of the destination. This 36-bit address identifies the host location and identity within the specified location, i.e. Host's IID=MPLS label||16-bit MAC. The compression module in the querying node can remove the entire destination address prefix shown in Table 3 as the first leftmost 28 bits in the 64 bit IPv6 source IID. These addresses can otherwise be formatted as IPv6 data packets using these shortened addresses as the Interface Identifier.

After the packet is forwarded to the edge router ER1, it checks the first leftmost 20-bit label in the destination address Interface Identifier and determines the next hop. From the destination address label, it identifies the destination domain 105 of the destination node. Using its forwarding tables, it can then determine an appropriate path, such as an LSP, to the destination domain. In FIG. 1, the path is to domain 102, then domain 104 and then domain 105. There is an alternative path to domain 102, then domain 103, to domain 105. The edge router selects one of the paths and then prepends the message with the label for domain 102. The label indicates the next hop for the packet and the edge router then forwards the message on the selected LSP which terminates at ER5, the edge router for domain 105.

In one embodiment, the message with its MPLS wrapper is sent using MPLS procedures. MPLS can be combined with a local or remote path computation element (PCE) to provide efficient traffic engineering at a relatively low cost. PCE can use different parameters that can be sent periodically by the edge routers to the central entity, such as battery power, traffic load, alarms, etc in order to generate optimal routes.

The original message from the host querying node is unaffected by the edge router. The edge router reads the destination address and then adds label routing as a wrapper for the original message. If the standards for MPLS are used, then the label routing is prepended to the original message and it identifies the source router, the destination router and the next hop in the path. These identifications are all provided as labels, rather than IP addresses. In one embodiment, the labels are all 20-bit labels assigned by a remote central entity.

When the message arrives at the edge router ER5 for the destination domain, the destination router prepares the packet to be sent from the edge router to the destination node within the domain. First it removes the wrapper and all of the associated labels and path information. In addition, it modifies the remaining message before it forwards the message on to host B.

In order to allow the receiving host B to identify the source node, the edge router inserts the label for the source domain into host A's Interface Identifier. Host B can then identify host A by host A's domain label and its short MAC address. Using this information, host B can apply the full Interface Identifier to address tables to generate host A's full IPv6 address.

The edge router can obtain the label for the source domain from the wrapper. As mentioned above, the wrapper will include the label for the source domain. The edge router can read this source label before removing the wrapper so that it can then add this information to the message from host A.

In addition, the edge router removes its own label from host B's Interface Identifier. As mentioned above, the original message from host A included the domain label for host B as well as the short address for host B. Since the message is now in host B's domain, the label for the domain is no longer needed. Removing the 20-bit label from host A's message reduces the number of bits sent over the air interface.

The edge router then forwards the packet to host B. As shown in FIG. 1, the path from the edge router ER5 to host B may include other nodes, such as a router R5. Host B then reads the message and is able to fully identify the source using the domain label and the short address. In one embodiment host B reconstructs the IPv6 header of host A for security validation.

Host A was identified above as a querying node. Host B, after receiving the packet, may respond to the query. An inverse path can be used to carry host B's response to host A. In brief, host B can generate a packet with compressed addressing. The source address can be a simple 16-bit address and the destination address can be a short 36-bit address consisting of a destination domain label and a short address. The edge router in domain 105, upon receiving the packet reads the destination domain label and routes the packet to domain 101 using a label switched path (LSP). The techniques outlined for MPLS may be used or a modification thereof.

The edge router of the destination domain, upon receiving the packet can remove all of the MPLS prepends or wrappers and modify the message before sending it to the destination host node A. By removing the domain label for the destination node and adding a domain label for the source node, the destination node A receives full source address information with a minimum of data.

The example described above represents a scenario in which all of the nodes including the edge routers belong to the "constrained devices" category. However, the invention is not so limited. The approach is particularly suitable for a large deployment located in an area with limited access to the outside world. MPLS forwarding allows the total amount of bits sent over the air interface between the edge routers to be significantly reduced. This in turn, results in reduced power consumption and longer battery lifetime. Nevertheless, because the messages maintain components of IPv6 and all of the nodes still possess complete IPv6 addressing, it is still possible to access a host from outside the 6LoWPAN domains, e.g., using the domain name system (DNS).

The approach shown in FIG. 1 allows for end-to-end as well as point-to-point security. In some scenarios where multiple applications are deployed, data can be classified. In these cases, a form of traffic engineering can be used to provide enough assurance that the most valuable data will be always given priority especially in case of emergency.

Figure 2:
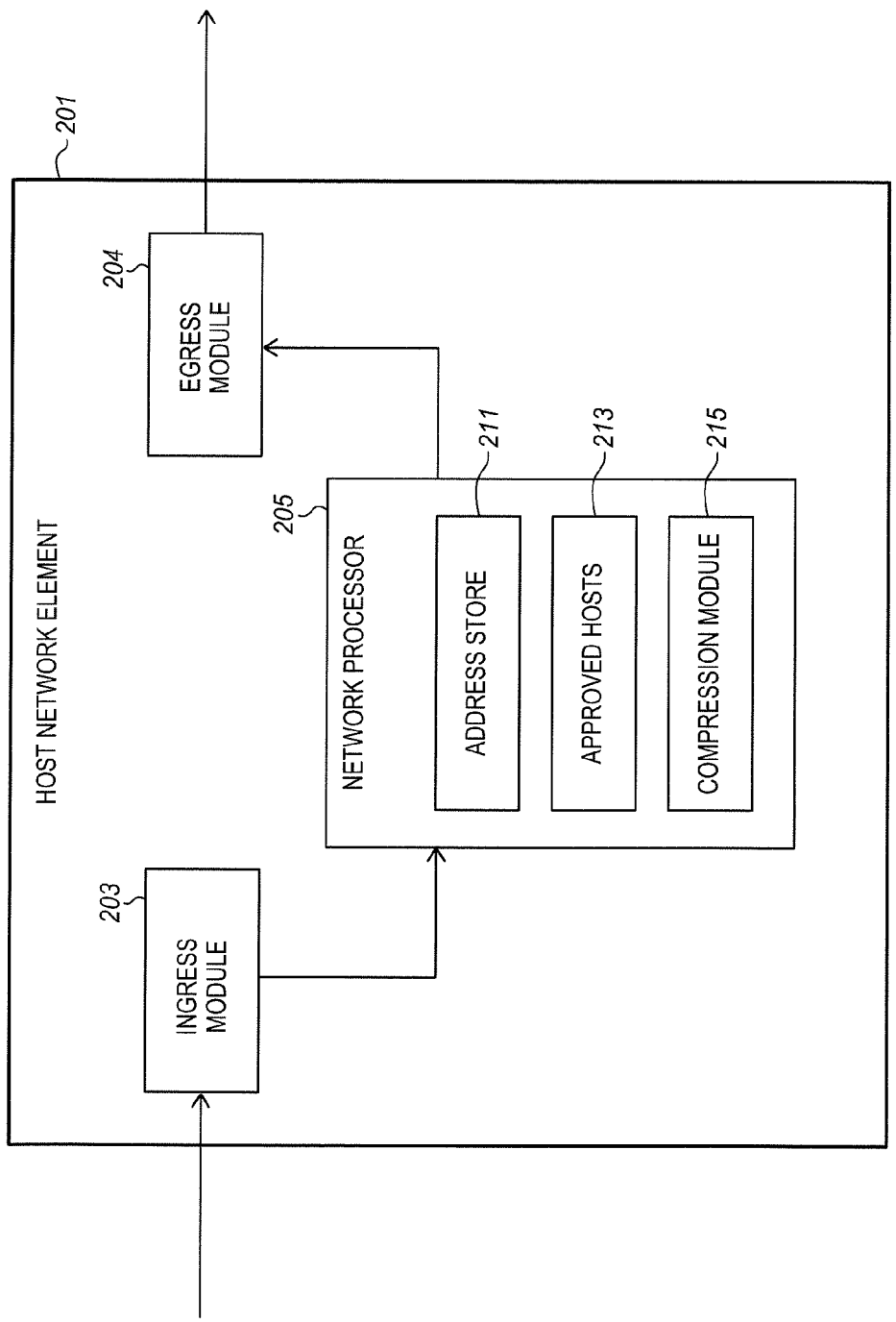
FIG. 2 is a block diagram of a host network element according to an embodiment of the invention.

FIG. 2 shows an example of a host network element 201 as a simplified block diagram. In FIG. 2, packets are received through an ingress module 203. This may be a wired or wireless interface or both, depending on the particular implementation. The packets received at the ingress module are routed to a network processor 205 which includes, among other things an address store 211, a list of approved hosts 213, and an address compression module 215. The network processor modifies incoming packets and generates its own packets to send out through the egress module 204.

The host network element 201 uses the address store 211 to store its own address, the label for its domain as well as addresses for other nodes on the network inside and outside of the domain. In addition to the short form addresses described in the context of FIG. 1, the address store can contain full IPv6 format addresses for itself and for other nodes. This allows full addressability to be realized by the host.

The list of approved hosts 213 can be provided by an edge router or a central entity through the edge router. These hosts can be those that are authorized by security protocols as safe. In one embodiment, the host is limited to communications with particular hosts in order to reduce overall traffic. For queries to nodes other than the listed hosts, packets may be routed through the authorized hosts. The compression module 215 allows addresses to be compressed as indicated in Tables 6 and 7 above.

Figure 3:
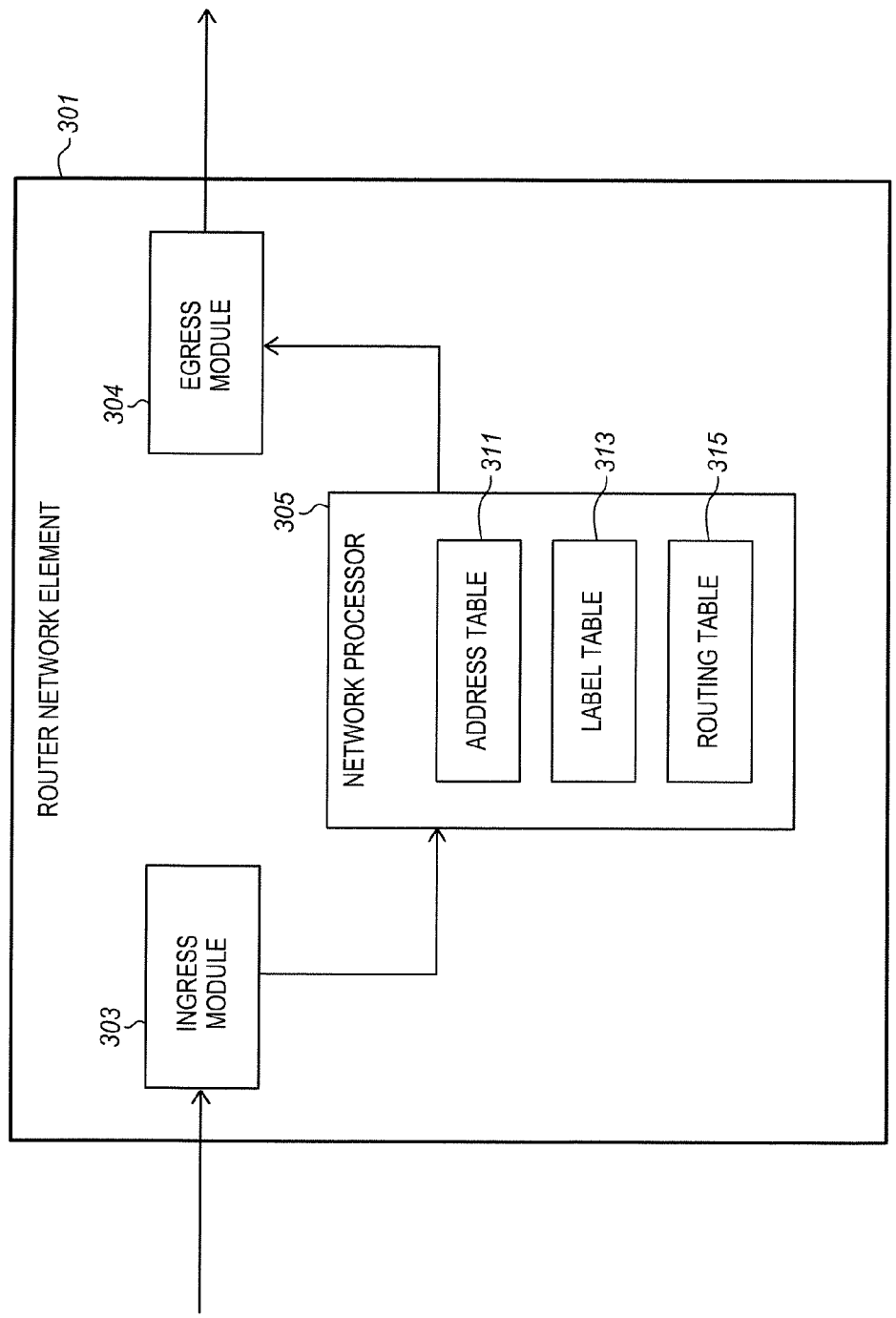
FIG. 3 is a block diagram of a router network element according to an embodiment of the invention.

FIG. 3 shows an example of a router network element 301 as a simplified block diagram. The network element includes an ingress module 303 to receive packets through a wired or wireless interface from other nodes of its own domain or other domains. The received packets are routed to a network processor that includes an address table 311, a label table 313 and a routing table 315. Received packets can be modified and new packets can be generated by the network processor and then sent through an egress module 304 to other routers, switches, and nodes.

The network processor can use the address table to store addresses for all of the nodes within its domain as well as for other outside routers and nodes with which it can communicate. These addresses may include the short form addresses as shown in Tables 6 and 7 as well as standard long form addresses. In addition, in the case of an edge router as shown in FIG. 1, the address table can be used to store address maps or tables to relate full MAC addresses of nodes within the domain to assigned short addresses. As mentioned above, the nodes of a particular domain may have an original IPv6 MAC address. The edge router can then assign short form addresses to each node. While it may be possible to use the 16 least significant bits of the full MAC address as a short form MAC address, there may be more than one node that has the same 16 least significant bits. Accordingly, the edge router can assign unique addresses to each node.

The label table 313 can be used to store labels for the edge router's domain as well as labels for each of the domains with which the edge router communicates. The table may also contain labels for other authorized nodes and a map to relate labels to full addresses. The routing table can be used to store routes to each other domain. As mentioned above, paths, such as LSPs, can be stored in each edge router.

The host and router network elements may contain many more components than shown. The router network element may also contain all of the information, tables, and functions that the host network element contains. While the host network element may contain all of the information and tables of the router network element, in a power constrained or radio constrained implementation, it may be desired to avoid any unnecessary data and configuration information in the host network element. The router network element shown in FIG. 1 as R1, R2, etc. may be modeled after one or both of FIG. 1 and FIG. 2.

Figure 4:
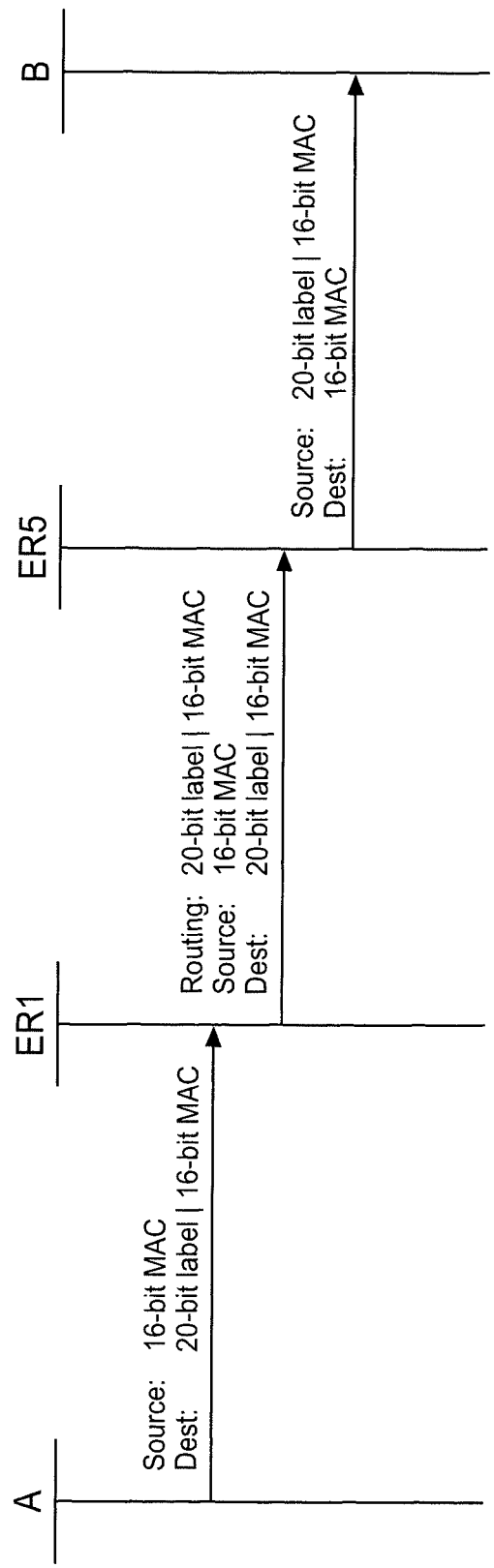
FIG. 4 is a simplified signaling diagram showing source and destination addresses at different nodes according to an embodiment of the invention.

FIG. 4 is in the form of signaling diagram showing the changes in addressing for the packet routing as described in the context of FIG. 1. At the left of the signaling diagram of FIG. 1, node A generates a packet with a source address and a destination address. The source address is a 16-bit MAC address or some other assigned unique 16-bit address. This address identifies node A to the edge router to which the packet is addressed. The destination address consists of a 20-bit label plus a 16-bit MAC address. The label identifies the domain of the destination node and the 16-bit MAC address identifies the particular node within that domain.

The edge router ER1 receives the packet from node A and, as shown, makes no change to the addressing of the packet. Instead the edge router reads the destination address of the packet and attaches routing to the packet. The routing consists of the 20-bit label and 16-bit MAC address of the destination address. In an alternative, the routing address includes the label for the domain of the next hop, or uses the label of the next hop instead of the label of the destination domain.

The final edge router ER5 receives the packet from the initial edge router ER1 either directly or through other routers and removes the routing information. It modifies the packet by removing the 20-bit label of the destination node and adding the 20-bit label of the source node. The final edge router then forwards the packet within the domain of the final edge router to the destination node B.

As shown in FIG. 4, the final edge router knows the domain label of the source node from the routing information. Similarly, the initial edge router knows its own domain label. In an alternative embodiment, the initial edge router can modify the packet from node A as shown for the final edge router. In other words, the initial edge router ER1 can remove the label from the destination address and add the source domain label to the source address. The edge router can then add the routing addresses and forward the packet to the final edge router. This alternative simplifies the operations of the final edge router, but reduces robustness in the packet routing. By removing a portion of the source address from the encapsulated packet, there is a chance that if the wrapper is corrupted, it will not possible to forward the packet because there is not enough information remaining in the destination address.

Figure 5:
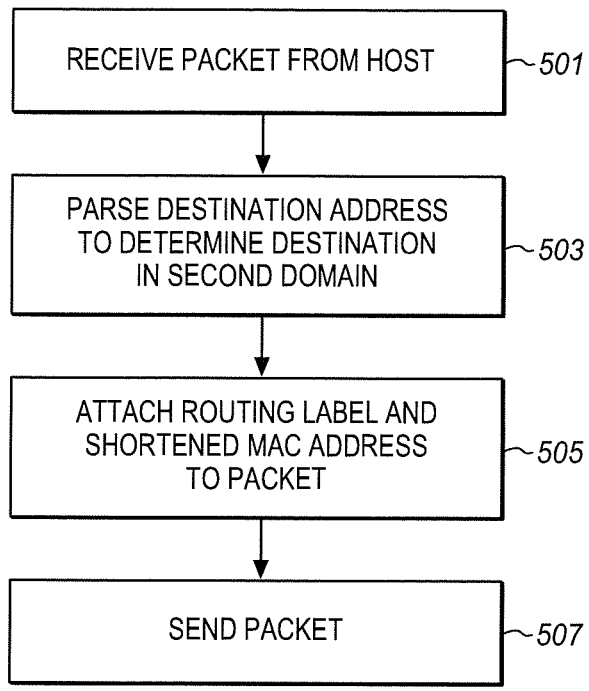
FIG. 5 is a process flow diagram of routing a packet from an edge router in a first domain to an edge router in a second domain according to an embodiment of the invention.

FIG. 5 is a process flow diagram showing operations performed by the initial edge router, shown as ER1 in FIG. 1. At 501, the edge router receives a packet at its ingress module from a host node. At 503, the edge router parses destination address of the packet to determine the intended destination of the packet including the destination domain. The edge router can also determine a path using forwarding tables for the destination domain.

At 505, a routing label is attached to the packet based on the destination domain. The routing label includes a label for the destination domain as well as a short form address for the destination node within the domain. At 507, the packet is routed from the egress module of the edge router along the appropriate path to the destination domain.

Figure 6:
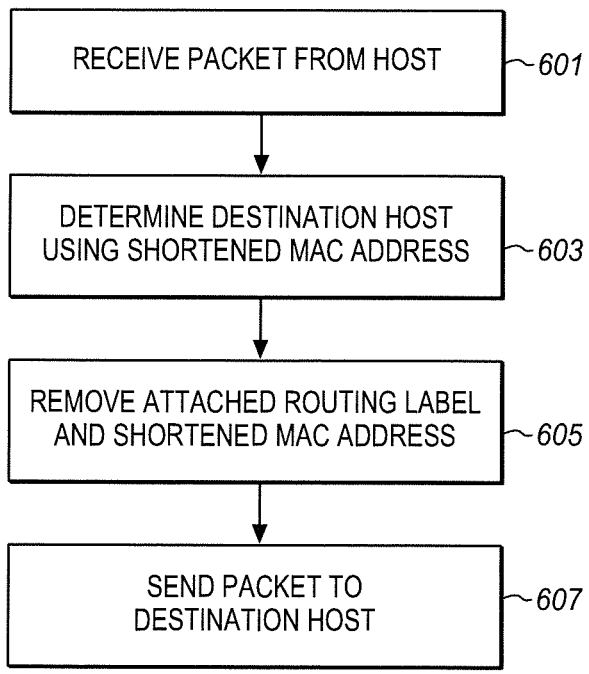
FIG. 6 is a process flow diagram of routing a packet received from an edge router in a first domain at an edge router in a second domain to a host in the second domain.

FIG. 6 is a process flow diagram showing the operations performed by a final edge router shown as ER5 in the FIG. 1. At 601, the final edge router receives the routed packet from the source host through the label switched path at its ingress module. At 603, the router determines the destination host within its own domain using the short form destination address of the packet.

At 605, the edge router prepares the packet for transmission within its own domain to the destination node. It removes the routing labels, decapsulating the original message from the source node. It also removes the destination domain label from the original message and attaches a source domain label to more fully identify the source node. Then at 607 its sends the modified packet through its egress module to the destination node within its own domain.

Figure 7:
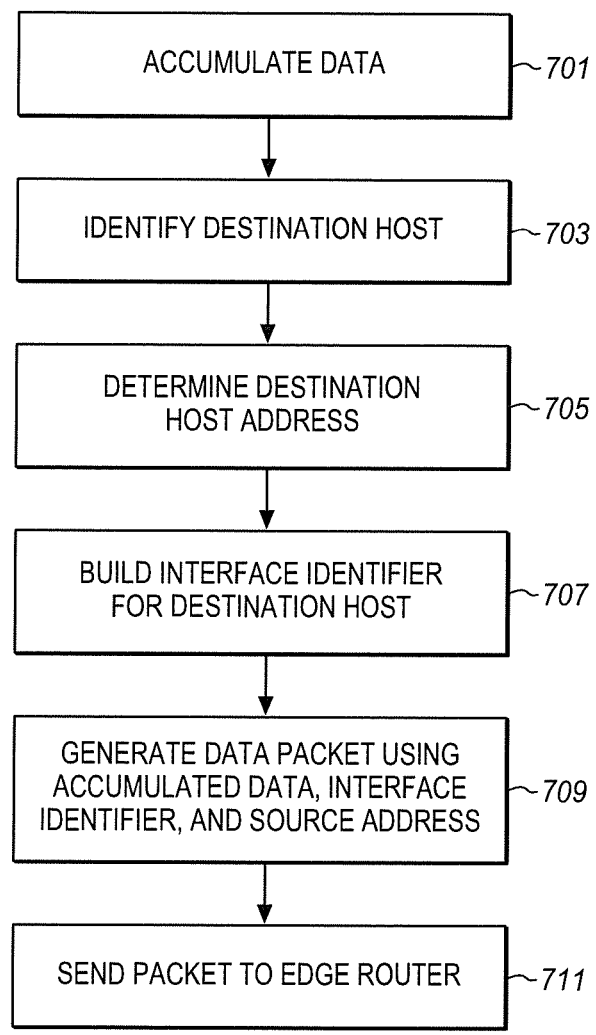
FIG. 7 is a process flow diagram of sending a packet from a host in one domain to a host in another domain through an edge router according to an embodiment of the invention.

FIG. 7 is a process flow diagram of operations performed by a host to send a packet to a node in a different domain. At 701, the host accumulates data to send as the packet payload. This data may be collected sensor data in the case of a sensor host. The data may include data collected from external sensors, including other nodes within the host's domain. Alternatively, the data may be queries to be answered by the destination node requesting data or other information. Alternatively, the data may be user data or a user request for data hosted or conveyed through the destination node.

At 703, the host identifies the destination node. This operation may be performed before or after the data is accumulated. At 705, the host determines the address for the destination address. The determined address may be a full 128-bit IPv6 address, a short form 72-bit 6LoWPAN address, the 16-bit short MAC address described herein or any other suitable form of address. Having determined this address, the host builds an interface identifier for the destination node. In the examples above, this address consists of a short address to the node, plus a domain label for the node.

At 709 a data packet is generated using the interface identifier built at 707, a source address identifying the sending node, and the payload data. At 711, the packet is sent through the host's egress module to the edge router.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Alternative Embodiments

While embodiments of the invention has been described in relation to a XYZ, other XYZ. Therefore, embodiments of the invention are not limited to XYZ. In addition, while embodiments of the invention have been described in relation to XYZ, alternative embodiments could be implemented such that XYZ. Such an embodiment could be implemented by having XYZ.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed at a network element located in a first domain for routing a packet from a host in the first domain to a host in a second communicatively coupled domain, each domain having a plurality of hosts that connect communicatively couple through a common network element of the respective domain, the network element communicatively coupled through a label switched path to the second domain, the method comprising:

receiving a packet from the host in the first domain at the network element in the first domain, the packet including a destination address to the host in the second domain, the destination address being formed by replacing an Interface Identifier of an IP address by a second domain label and a shortened Media Access Control (MAC) address, the second domain label identifying the second domain, wherein the shortened MAC address is pre-provisioned;

parsing the received packet to determine a destination of the packet in the second domain, based on the destination address;

attaching a routing label and the shortened MAC address to the received packet, the routing label indicating a path to the second domain and the shortened MAC address indicating the destination host in the second domain; and sending the packet with the attached routing label and shortened MAC address on a label switched path indicated by the label to the second domain.

2. The method of claim 1, wherein the step of attaching the routing label and the shortened MAC address comprises attaching a wrapper to the received packet.

3. The method of claim 1, wherein the step of receiving the packet comprises receiving the packet including a source address, the source address being formed by replacing an Interface Identifier of an IPv6 address by a shortened MAC address identifying the host from which the packet was received.

4. The method of claim 3, wherein the source address does not include an identification of the first domain.

5. The method of claim 4, wherein the step of receiving the source address comprises receiving the source address as part of an IPv6 (Internet Protocol version 6) packet.

6. The method of claim 1, wherein the step of attaching a routing label comprises attaching the second domain label.

7. The method of claim 1, wherein the step of attaching the routing label comprises attaching a routing label indicating a next network element in the path.

8. The method of claim 1, further comprising the step of determining a path for the received packet based on the second domain label of the destination address.

9. The method of claim 1, wherein the destination address includes an Interface Identifier, the Interface Identifier consisting essentially of the second domain label and the shortened MAC address.

10. The method of claim 1, wherein the destination address is comprised in an address of an IPv6 packet, that is modified to remove a prefix and a portion of the Interface Identifier.

11. A network element for use in a first domain communicatively coupled through a label switched path to a second domain, each domain having a plurality of hosts that communicatively coupled through a common network element of the respective domain, wherein the network element is operative to route packets from a host in the first domain to a host in the second domain, the network element comprising:
    an ingress module operative to receive a packet from the host in the first domain at the network element, the received packet including a destination address of the host in the second domain, the destination address being formed replacing an Interface Identifier of an IP address by a second domain label and a shortened MAC (Media Access Control) address, the second domain label identifying the second domain, wherein the shortened MAC address is pre-provisioned;
    a processor operative to parse the received packet to determine a destination of the packet in the second domain, based on the destination address and to attach a routing label and the shortened MAC address to the received packet, the routing label indicating a path to the second domain and the shortened MAC address indicating the destination host in the second domain; and
    an egress module operative to send the packet with the destination address and the routing label on a label switched path indicated by the label to the second domain.

12. The network element of claim 11, wherein the attached routing label and shortened MAC address comprise a wrapper attached to the packet.

13. The network element of claim 11, wherein the received data packet comprises a source address, the source address including a shortened MAC address identifying the host from which the packet was received.

14. The network element of claim 11, wherein the attached routing label comprises the second domain label.

15. The network element of claim 11, wherein the attached routing label comprises an identification of a next network element in the path.

16. A method performed in a network element for routing a packet from a host in a first domain to a host in a second connected domain, each domain having a plurality of hosts that connect through a common network element of the respective domain, the network element being in the second domain and connected through a label switched path to the first domain, the method comprising the steps of:
    receiving a packet though a label switched path from the host in the first domain at the network element in the second domain through a network element in the first domain, the packet including an attached destination label to indicate the second domain and an attached shortened MAC address to indicate a destination host in the second domain;
    determining the destination host using the shortened MAC address;
    removing the attached destination label and the attached shortened MAC address; and
    sending the packet to the determined destination host.

17. The method of claim 16, wherein the step of receiving the packet comprises receiving the packet including a destination address having an Interface Identifier of the destination host, the method further comprising the step of replacing the Interface Identifier with a shortened MAC address of the destination host.

18. The method of claim 16, wherein the step of receiving the packet comprises receiving the packet including an IPv6 header having an Interface Identifier, the method further comprising the step of removing an identification of the second domain from the Interface Identifier.

19. The method of claim 16, wherein the step of receiving the packet comprises receiving the packet including a source address, the method further comprising the step of adding a label indicating the first domain to the source address.

20. A network element for use in a second domain connected through a label switched path to a first domain, each domain having a plurality of hosts that connect through a common network element of the respective domain, wherein the network element is operative to route packets from a network element in the first domain to a host in the second domain, the network element comprising:
    an ingress module operative to receive a packet through a label switched path from the host in the first domain at the network element through a network element in the first domain, the packet including an attached second domain label to identify the second domain and an attached shortened MAC address to indicate a destination host in the second domain;
    a processor operative to determine the destination host using the shortened MAC address and to remove the attached second domain label and the attached shortened MAC address; and
    an egress module operative to send the packet to the determined destination host.

21. The network element of claim 20, wherein the packet further comprises a destination address having an Interface Identifier of the destination host, the processor further operative to replace the Interface Identifier with a shortened MAC address of the destination host.

22. The network element of claim 20, wherein the packet comprises an IPv6 header having an Interface Identifier, the processor being further operative to remove an indication of the second domain from the Interface Identifier.

23. A method performed at a network element located in a first domain for routing a packet to a host in a second communicatively coupled domain, each domain having a plurality of hosts that communicatively coupled through a common router of the respective domain, the network element communicatively coupled to the second domain using a label switched path through routers of the respective domains, the method comprising:

generating a packet for the host in the second domain at the network element in the first domain, the packet including a destination address to the host in the second domain, the destination address being formed by replacing an Interface Identifier of an IP address by a second domain label and a shortened Media Access Control (MAC) address, the second domain label identifying the second domain, wherein the shortened MAC address is pre-provisioned; and sending the packet to the router in the first domain.

24. The method of claim 23, wherein the step of generating a packet further comprises generating a packet having a source address that does not include an identification of the first domain.

25. The method of claim 24, wherein the step of generating a packet comprises generating the packet having the source address instead of an Interface Identifier of an IP address and the destination address instead of an Interface Identifier of an IP address.

26. The method of claim 25, wherein the IP addresses have no IPv6 prefix.

27. A network element located in a first domain operative to route a packet to a host in a second communicatively coupled domain, each domain having a plurality of hosts that communicatively coupled through a common router of the respective domain, the network element communicatively coupled to the second domain through routers of the respective domains, the network element comprising:

a processor operative to generate a packet for the host in the second domain at the network element in the first domain, the packet including a destination address to the host in the second domain, the destination address being formed by replacing an Interface Identifier of an IP address by a second domain label and a shortened Media Access Control (MAC) address, the second domain label identifying the second domain, wherein the shortened MAC address is pre-provisioned; and an egress module operative to send the packet to the router in the first domain.

* * * * *